(12) United States Patent
Motohashi et al.

(10) Patent No.: US 12,023,751 B2
(45) Date of Patent: Jul. 2, 2024

(54) ROBOT CONTROL DEVICE AND ROBOT SYSTEM

(71) Applicant: FANUC CORPORATION, Yamanashi (JP)

(72) Inventors: Masao Motohashi, Yamanashi (JP); Takahiro Kitano, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1165 days.

(21) Appl. No.: 16/801,100

(22) Filed: Feb. 25, 2020

(65) Prior Publication Data
US 2020/0306865 A1    Oct. 1, 2020

(30) Foreign Application Priority Data

Mar. 29, 2019  (JP) .................................. 2019-066351

(51) Int. Cl.
| | | |
|---|---|---|
| *B23K 11/11* | (2006.01) | |
| *B25J 9/16* | (2006.01) | |
| *B25J 11/00* | (2006.01) | |

(52) U.S. Cl.
CPC ............... *B23K 11/11* (2013.01); *B25J 9/163* (2013.01); *B25J 9/1633* (2013.01); *B25J 11/005* (2013.01)

(58) Field of Classification Search
CPC ....... B23K 11/11; B23K 11/115; B23K 11/31; B23K 11/36; B25J 9/163; B25J 9/1633; B25J 11/005; B25J 11/00; B25J 13/00; B25J 13/08; B25J 19/02;
(Continued)

(56) References Cited

U.S. PATENT DOCUMENTS

| | | | |
|---|---|---|---|
| 10,493,617 B1 * | 12/2019 | Holson | .................... B25J 5/007 |
| 2009/0069936 A1 | 3/2009 | Kock et al. | |

FOREIGN PATENT DOCUMENTS

| | | |
|---|---|---|
| CN | 102079008 A | 6/2011 |
| CN | 102139399 A | 8/2011 |
| CN | 102310258 A | 1/2012 |

(Continued)

OTHER PUBLICATIONS

An Office Action; "Notice of Reasons for Refusal", mailed by the Japanese Patent Office on May 11, 2021, which corresponds to Japanese Patent Application No. 2019-066351 and is related to U.S. Appl. No. 16/801,100; with English language translation.

*Primary Examiner* — Basil T. Jos
(74) *Attorney, Agent, or Firm* — Studebaker & Brackett PC (57) ABSTRACT

A robot control device for a robot system including: a robot having a plurality of internal drive axes; a processing head retained to a leading end of the robot and having a processing tool and a tool drive axis to move the processing tool; and an external driving mechanism having one or more external drive axes and positions the robot. The robot system causes the processing tool to make contact with a processing target and conducts predetermined processing on the processing target. The control device controls the internal and external drive axes to position the processing head at a target position and controls the tool drive axis to make the processing tool make contact with the processing target, and the robot control device detects contact between the processing tool and the processing target by monitoring torque of the internal drive axis, the tool drive axis and the external drive axis.

11 Claims, 7 Drawing Sheets

(58) Field of Classification Search
CPC ........... G05B 2219/37405; G05B 2219/45104; G05B 19/402
See application file for complete search history.

(56) References Cited

FOREIGN PATENT DOCUMENTS

| | | |
|---|---|---|
| CN | 106862742 A | 6/2017 |
| CN | 108213679 A | 6/2018 |
| JP | H07-178690 A | 7/1995 |
| JP | H11-320466 A | 11/1999 |
| JP | 2001-105153 A | 4/2001 |
| JP | 2001-150150 A | 6/2001 |
| JP | 2010-253676 A | 11/2010 |
| JP | 2011-088175 A | 5/2011 |
| JP | 2011-152582 A | 8/2011 |
| JP | 2012-011403 A | 1/2012 |
| JP | 2016-028842 A | 3/2016 |
| JP | 2017-056488 A | 3/2017 |

* cited by examiner

ROBOT CONTROL DEVICE AND ROBOT SYSTEM

This application is based on and claims the benefit of priority from Japanese Patent Application No. 2019-066351, filed on 29 Mar. 2019, the content of which is incorporated herein by reference.

BACKGROUND OF THE INVENTION

Field of the Invention

The present invention relates to a robot control device and a robot system.

Related Art

Robot systems which bring a processing tool such as a spot welding gun into contact with a workpiece (processing target) by way of an articulated robot, and conduct predetermined processing such as spot welding on a workpiece have been widely employed. The robot system performing spot welding includes: a spot welding gun (processing head) which has a mobile electrode that is driven by a tool-drive axis (gun axis) motor and a counter electrode which is arranged to oppose this; and an articulated robot which holds the spot welding gun to an arm leading end and is driven by a plurality of internal drive axis motors. Such a spot welding system performs spot welding, after relatively moving the workpiece and spot welding gun using the robot, by sandwiching a workpiece between the mobile electrode and counter electrode by closing the mobile electrode and counter electrode of the spot welding gun towards a welding point location of the workpiece, and applying voltage between both electrodes.

With a conventional spot welding system, if a teaching position, or the workpiece position (spot welding point position) of the operating program (work program) of the robot or spot welding gun, is shifted from the actual workpiece position, excessive load acts on the workpiece to deform the workpiece, and may lead to a decline in weld quality. In order to avoid such a situation, technology of compensating the target position of the spot welding gun (workpiece position in operating program) by detecting contact between the workpiece and spot welding gun has been known.

Technology has been known which focuses on the change trend of the torque information of the tool drive axis motor When the workpiece contacts with the electrode upon performing the operation of closing the spot welding gun, monitors the torque of the tool drive axis motor upon performing the operation of closing the spot welding gun, estimates the contact position between the workpiece and electrode from the change in the change trend of the torque information, and compensates the target position of the spot welding gun (workpiece position in operating program) based on the estimated contact position (for example, refer to Patent Documents 1 and 2).

In addition, the torque of the internal drive axis motor also varies (increases or decreases) when the electrode and workpiece make contact upon performing the operation of closing the spot welding gun. Technology has been known which focuses on this property, monitors the torque of the internal drive axis motor upon performing the operation of closing the spot welding gun, and compensates the target position of the spot welding gun (workpiece position in operating program) based on the time or position when the torque reached the threshold (for example, refer to Patent Documents 3 and 4).

In addition, compliance control has also been known which configures so that the electrodes do not excessively press the workpiece by suppressing the torque of the robot.

Patent Document 1: Japanese Unexamined Patent Application, Publication No. 2011-88175
Patent Document 2: Japanese Unexamined Patent Application, Publication No. 2011-152582
Patent Document 3: Japanese Unexamined Patent Application, Publication No. 2001-150150
Patent Document 4: Japanese Unexamined Patent Application, Publication No. 2012-11403
Patent Document 5: Japanese Unexamined Patent Application, Publication No. 2010-253676

SUMMARY OF THE TNVENTTON

With the method using torque information of the tool drive axis, it is necessary to cause the mobile electrode and workpiece to make contact, and it is not possible to detect contact in the case of the counter electrode and workpiece making contact. In addition, with such a spot welding system that separately includes a controller to control the internal drive axes and a controller to control the tool drive axis, a delay arises upon referencing the torque information of the tool drive axis from the robot controller. In addition, in the case of observing whether or not the motor torque has reached a threshold, since contact between the electrode and workpiece is detected at a stage in which the workpiece deforms and stress increases, it is not possible to detect the instant of contact between the electrode and workpiece, and thus the detection accuracy of the contact position is relatively low. For this reason, a robot control device and robot system which can more reliably prevent damage to the processing tool or processing target by the processing tool excessively pressing the processing target has been desired.

A robot control device according to an aspect of the present disclosure is a robot control device for a robot system that includes: an articulated robot having a plurality of internal drive axes; a processing head which is retained to a leading end of the robot, and has a processing tool and a tool drive axis that causes the processing tool to move; and an external driving mechanism which has one or a plurality of external drive axes and positions the robot, in which the robot system causes the processing tool to make contact with a processing target, and conducts predetermined processing on the processing target, in which the control device controls the internal drive axis and the external drive axis so as to position the processing head at a target position which is set as a position of processing the processing target, and controls the tool drive axis so as to make the processing tool make contact with the processing target, and the robot control device detects contact between the processing tool and the processing target by monitoring torque of the internal drive axis, the tool drive axis and the external drive axis, and performs position compensation of the robot.

A robot control device according to another aspect of the present disclosure is a robot control device for a robot system that includes: an articulated robot having a plurality of internal drive axes; a processing head which is retained to a leading end of the robot, and has a processing tool and a tool drive axis that causes the processing tool to move; and an external driving mechanism which has one or a plurality of external drive axes and positions the robot, in which the robot system causes the processing tool to make contact with the processing target, and conducts predetermined processing on the processing target, the control device controls the internal drive axis and the external drive axis so as to position the processing head at a target position which is set as a position of processing the processing target, and controls the tool drive axis so as to make the processing tool make contact with the processing target, and the robot control device comprises a torque limiting unit which reduces output torque of at least one torque limiting axis among the internal drive axis and the external drive axis.

According to the present disclosure, it is possible to provide a robot system which can prevent damage of a processing tool or processing target.

DETAILED DESCRIPTION OF THE INVENTION

Hereinafter, each embodiment of a robot system according to the present disclosure will be explained while referencing the drawings.

First Embodiment

Figure 1:
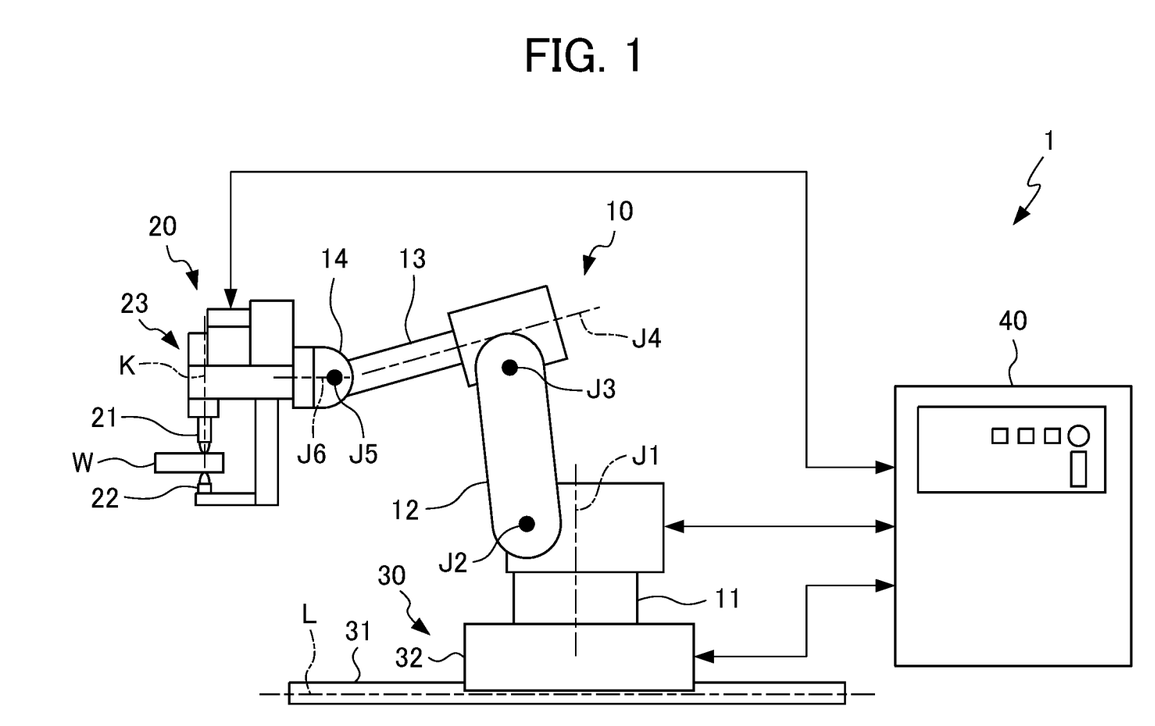
FIG. 1 is a schematic diagram showing the configuration of a robot system according to a first embodiment of the present disclosure.

FIG. 1 is a view showing the configuration of a robot system 1 according to a first embodiment of the present disclosure. The robot system 1 in FIG. 1 is a spot welding system which spot welds a processing target (workpiece).

The robot system 1 in FIG. 1 includes: an articulated robot 10; a processing head (welding gun) 20 which is retained to a leading end of the robot 10; an external driving mechanism 30 which causes the overall robot 10 to move relative to the processing target W to be positioned; and a control device 40 which controls operation of the processing head 20 and external driving mechanism 30. The control device 40 in itself is an embodiment of a robot control device 40 according to the present disclosure.

The robot 10 positions the processing head 20 held to a leading end relative to the processing target W. Hereinafter, although the robot 10 is explained as a 6-axis vertical articulated robot having the six internal drive axes (robot axes) J1 to J6, the robot 10 can be established as an articulated robot having any number of internal drive axes such as a four axis vertical articulated robot, for example.

The robot 10 has a stand (base) 11, lower arm 12, upper arm 13, and arm leading end 14. The stand 11 is installed on the floor. One end side of the lower arm 12 is connected on the stand 11 to be rotatable around a first axis (vertical axis) J1, and to be rotatable around a second axis (horizontal axis) J2. To the other end side of the lower arm 12, one end side of the upper arm 13 is connected to be rotatable around a third axis (horizontal axis) J3. To the other end side of the upper arm 13, the arm leading end 14 is connected to be rotatable around a fourth axis J4 perpendicular to the third axis J3, and to be rotatable around a fifth axis J5 perpendicular to the fourth axis J4. To the arm leading end 14, the processing head 20 is mounted to be rotatable around a sixth axis J6 perpendicular to the fifth axis J5.

The robot 10 has built in a plurality of internal drive axis motors (not shown) which respectively drive the plurality of internal drive axes J1 to J6. The internal drive axis motor can be configured by a servomotor. Each of the internal drive axis motors is driven according to a control signal from the control device 40, and the position and posture of the processing head 20 is thereby changed. The servomotor for each internal drive axis has an encoder, and the rotation angle around each axis is detected by the encoder. The detected rotation angle, i.e. positions of the internal drive axes J1 to J6 (relative angles of stand 11, lower arm 12, upper arm 13 and arm leading end 14) are delivered to the control device 40 and fed back to control of the control device 40.

The plurality of internal drive axes J1 to J6 include a plurality of base axes which mainly define the position (coordinates) of the processing head 20; and a plurality of wrist axes which mainly define the orientation (posture) of the processing head 20. More specifically, among the internal drive axes J1 to J6, the first axis J1, the second axis J2 and third axis J3, which are a vertical axis or horizontal axis, are base axes, and the fourth axis J4, fifth axis J5 and sixth axis J6 are wrist axes.

The processing head 20 has a first processing tool 21 and second processing tool 22 which are provided so as to face each other, as well as a clamp mechanism having a tool drive axis K that causes the first processing tool 21 to move towards the second processing tool 22. The processing head 20 of the present embodiment is a so-called C-type spot welding gun.

In the robot system 1 of the present embodiment, the first processing tool 21 and second processing tool 22 of the processing head 20 are welding electrodes which apply electrical current to the processing target W by contacting the processing target W. In other words, the first processing tool 21 is the mobile electrode, and the second processing tool 22 is the fixed electrode. The clamp mechanism 23 causes the first processing tool 21 to contact the processing target W, by causing the first processing tool 21 to move towards the second processing tool 22 by way of the tool driving axis K, in a state positioning the processing head so that the processing target W is positioned between the first processing tool 21 and second processing tool 22 by way of the robot 10. For this reason, the clamp mechanism 23 is controlled by the control device 40, and has a servomotor (not shown) which drives the tool drive axis K. The servomotor driving the tool drive axis K has an encoder, and feeds back to the control device 40 the rotation angle of the servomotor, i.e. position of the tool drive axis K (position of the first processing tool 21 relative to second processing tool 22).

The external driving mechanism 30, by causing the stand 11 of the robot 10, and thus the entire robot 10, to move, widens the range in which the robot 10 can arrange the processing head 20. The external driving mechanism 30 can be established as a configuration having at least one mechanism such as a motion mechanism which causes the stand 11 to move horizontally along a rail installed in the floor, a mechanism which causes the stand 11 to go up and down, and a mechanism which causes the stand 11 to rotate. In the present embodiment, the external driving mechanism 30 is explained as a motion mechanism which has a rail 31 and a mobile pedestal 32 which is installed to be mobile along the rail 31, and to which the stand 11 of the robot 10 is fixed.

The external driving mechanism 30 has an external drive axis L which decides the horizontal position of the stand 11. For this reason, the external driving mechanism 30 has a servomotor (not shown) which is controlled by the control device 40, and drives the external drive axis L. The servomotor driving the external drive axis has an encoder, and feeds back to the control device 40 the rotation angle of the servomotor, i.e. position of the external drive axis L (position of stand 11).

The control device 40 can be established as a configuration including an arithmetic processing unit having a CPU, ROM, RAM, other peripheral circuits, etc. In addition, the control device 40 may be established as a configuration including a plurality of arithmetic processing units which independently control the robot 10, processing head 20, external driving mechanism 30, or each drive axis J1 to J6, K and L. In the case of the control device 40 including a plurality of arithmetic processing units, any of the arithmetic processing units controlling the respective drive axes J1 to J6, K and L, or a separate arithmetic processing unit is configured so as to perform command of other arithmetic processing units so as to make all of the drive axes J1 to J6, K and L operate cooperatively.

The control device 40 causes the robot 10, processing head 20 and external driving mechanism 30 to operate based on teaching data including welding point data that specifies the position and posture (hereinafter may be called welding point position) of the processing head 20 when spot welding (processing) the processing target W at multiple welding locations. More specifically, the control device 40 causes the robot 10 to operate, and arranges the processing target W between the first processing tool 21 and second processing tool 22, by controlling the position and posture of the processing head 20 relative to the processing target W. In addition, the control device 40 sandwiches the processing target W between the first processing tool 21 and second processing tool 22 by driving the tool drive axis K to cause the first processing tool 21 to move. At this time, the control device 40 suppresses the contact pressure of the processing tools 21, 22 on the processing target W. In a state sandwiching the processing target W by the processing tools 21, 22, it is possible to spot weld the processing target W by flowing electrical current between the processing tools 21, 22.

Figure 2:
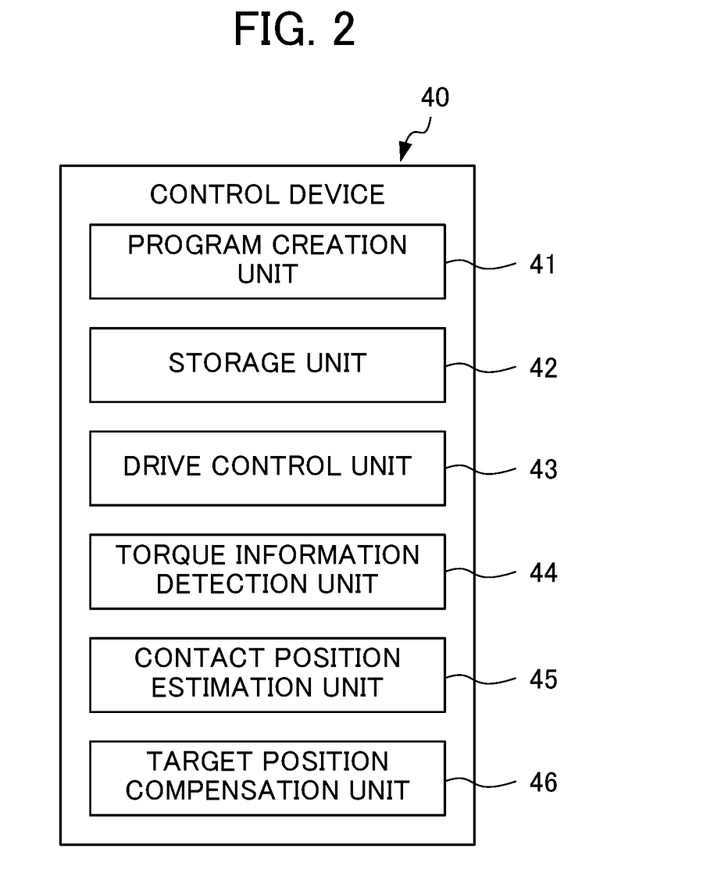
FIG. 2 is a block diagram showing the configuration of a control device of the robot system in FIG. 1.

FIG. 2 shows the configuration of the control device 40. The control device 40 has: a program creation unit 41 which creates work programs including information specifying the positions at which the internal drive axes J1 to J6, tool drive axis K and external drive axis L should be at each time; a storage unit 42 which stores the work programs created by the program creation unit 41; a drive control unit 43 which controls the internal drive axes J1 to J6, tool drive axis K and external drive axis L based on the work programs stored in the storage unit 42; a torque detection unit 44 which detects torque information of the drive axes J1 to J6, K and L; a contact position estimation unit 45 which estimates the contact position at which the processing target W and processing tools 21, 22 make contact, based on a change in the change trend of torque information of at least one control target axis among the drive axes J1 to J6, K and L detected by the torque information detection unit 44; and a target position compensation unit 46 which compensates the target position of the processing head 20 set as the position at which to process the processing target W based on the contact position estimated by the contact position estimation unit 45.

The program creation unit 41 creates work programs including information specifying the positions at which the internal drive axes J1 to J6, tool drive axis K and external drive axis L should be at each time, based on the teaching data including a plurality of welding spot positions. Since the creation method of such work programs is well known, a detailed explanation will be omitted.

The storage unit 42 can be configured from rewritable memory such as EEPROM, for example. The storage unit 42, in addition to work programs, can store various information such as teaching data, and time series data of torque information detected by the torque information detection unit 44, for example.

The drive control unit 43 causes the robot 10 to operate according to the work program stored in the storage unit 42. More specifically, the drive control unit 43 generates operation commands based on the target position of the processing head 20 and the feedback from the servomotors of the internal drive axes J1 to J6 and external drive axis and positions the processing head 20 by controlling driving of the drive axes J1 to J6, and K. Then, the drive control unit 43 establishes a state which can spot weld the processing target W by sandwiching the processing target W between the processing tools 21, 22 by driving the tool drive axis K.

Upon performing operation to sandwich the processing target W by the processing tools 21, 22 according to the work program, the torque information detection unit 44 detects the torque of the drive axes J1 to J6, K and L. More specifically, the torque information detection unit 44 acquires time series data of the positions of the drive axes J1 to J6, K and L, and torque information indicating the torque such as electrical current value of the servomotor fed back to the control device 40 from the servomotors driving the drive axes J1 to J6, K and L. The torque information detection unit 44 temporarily stores in the storage unit 42 the time series data of the torque information of the internal drive axis motors, and time series data of position of the robot 10 and time series data of the position of the tool drive axis to be associated.

The contact position estimation unit 45 estimates the contact position at which the processing target W and the first processing tool 21 or second processing tool 22 make contact, based on the change in the change trend (slope, change amount per unit time) of the torque information based on the time series data of torque information of the drive axes J1 to J6, K and L detected by the torque information detection unit 44 and temporarily stored in the storage unit 42. From the time series data of the position of the robot 10 and the time series data of the position of the tool drive axis K detected by the torque information detection unit 44 and temporarily stored in the storage unit 42, the contact position estimation unit 45 calculates the coordinate position at which the processing tools 21, 22 contact the processing target W from the position of the robot 10 and position of the tool drive axis K corresponding to the contact time estimated, and estimates this coordinate position as the contact position. It should be noted that, in the case of the internal drive axes J1 to J6 and external drive axis L stopping (operation of the robot 10 and external driving mechanism 30 ending) during operation of the tool drive axis K, although the first processing tool 21 contacts the processing target W, in the case of at least any of the internal drive axes J1 to J6 and external drive axis L operating, there is a possibility of the second processing tool 22 contacting the processing target W earlier than the first processing tool 21.

The target position compensation unit 46 compensates the target position (position corresponding to welding spot position) of the processing head 20 in the work program, based on the contact position estimated by the contact position estimation unit 45. For example, the target position compensation unit 46 compensates the target position in the work program stored in the storage unit 42. Since it is thereby possible to configure so that the first processing tool 21 or second processing tool 22 does not move further to the side of the processing target W after contacting the processing target W, it is possible to prevent the processing tools 21, 22 from deforming the processing target W by pressure welding with great force against the processing target W, and the processing tools 21, 22 damaging.

Figure 3:
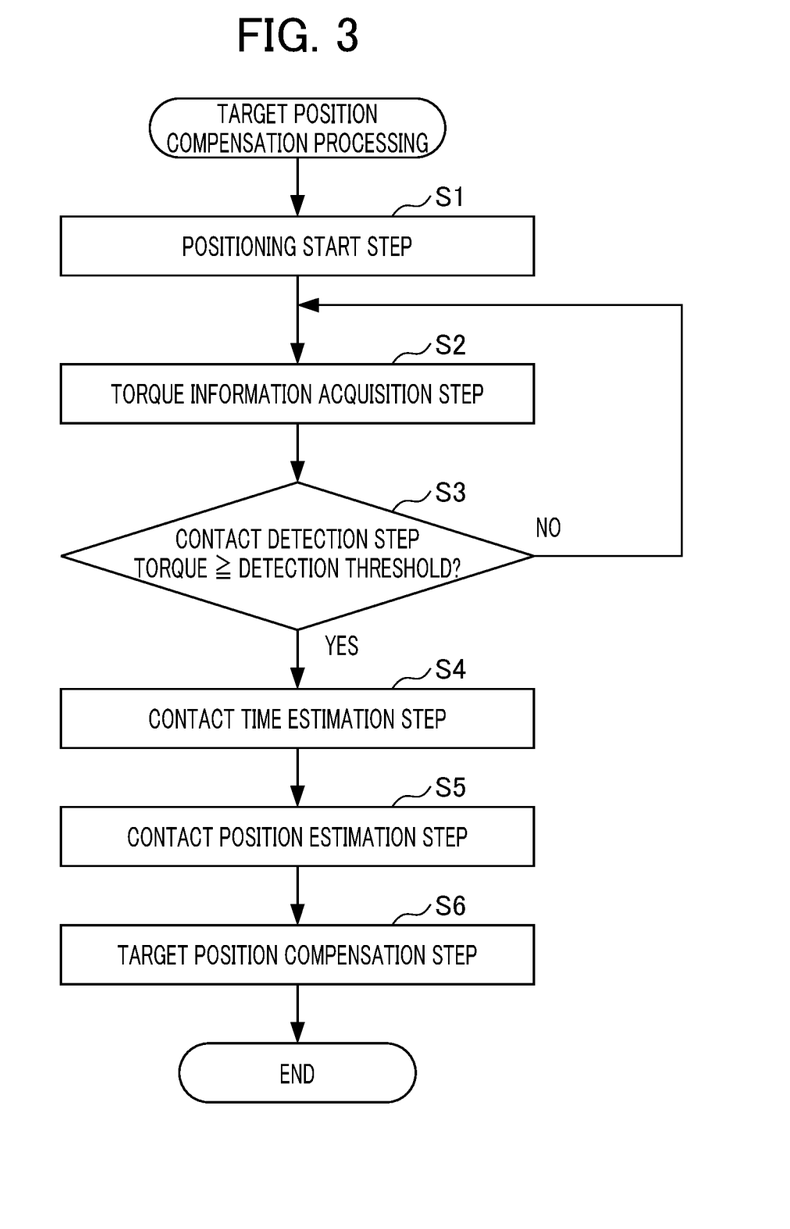
FIG. 3 is a flowchart of target position compensation processing by a control device according to the first embodiment.

Next, the processing in the robot system 1 relative to compensation of the target position (referred to as target position compensation processing) will be explained in detail. FIG. 3 shows a sequence of processing according to control of the control device 40.

The target position compensation processing of the robot system 1 includes: a step of starting positioning of the processing head 20 to the target position by making the robot 10, processing head 20 and external driving mechanism 30 operate according to the drive control unit 43 (Step S1: positioning start step); a step of acquiring torque information of at least one control target axis selected from among the drive axes J1 to J6, K and L by the torque information detection unit 44 (Step S2: torque information acquisition step); a step of detecting contact of the first processing tool 21 or second processing tool 22 with the processing target W based on the torque information acquired in the torque information acquisition step (Step S3: contact detection step); a step of estimating the time at which the first processing tool 21 or second processing tool 22 and the processing target K make contact based on the change in the change trend of the torque information (Step S4: contact time estimation step); a step of estimating the position (contact position) at which the first processing tool 21 or second processing tool 22 and the processing target W make contact based on the contact time estimated in the contact time estimation step (Step S5: contact position estimation step); and a step of compensating the target position of the processing head 20 based on the contact position estimated in the contact position estimation step (Step S6: target position compensation step).

(Positioning Start Step)

In the positioning start step of Step S1, the drive control unit 43 drives the robot 10 and external driving mechanism 30 so as to arrange the processing target W between the first processing tool 21 and second processing tool 22, according to the work program, and starts processing to perform a series of operations to sandwich the processing target W by the first processing tool 21 and second processing tool 22.

(Torque Information Acquisition Step)

In the torque information acquisition step of Step S2, the torque information detection unit 44 detects the torque information of at least one control target axis selected from among the drive axes J1 to J6, K and L as time series data. The torque information of the control target axis detected by the torque information detection unit 44 is stored in the storage unit 42 together with the time series data of the position information of the positions of the drive axes J1 to J6, K and L or the processing tools 21, 22 calculated from the positions of the drive axes J1 to J6, K and L.

(Contact Detection Step)

In the contact detection step of Step S3, the torque of each control target axis indicated by the torque information detected by the torque information detection unit 44, and detection threshold decided relative to each control target axis for every positioning operation relative to the target position are respectively compared. In other words, the contact position estimation unit 45 detects the torque rise of the control target axis according to the counterforce of the processing target W occurring in the case of the processing tools 21, 22 contacting with the processing target W, determining whether the torque of the servomotor driving any of the control target axes has become at least the detection threshold.

In the contact detection step of Step S3, in the case of the torques of all control target axes being less than the detection threshold, since the processing tools 21, 22 and processing target W are determined as still not making contact, the processing returns to Step S2, and acquires the torque information of the next time. On the other hand, in the case of the torque of any of the control target axes becoming at least the detection threshold, since the processing tools 21, 22 and processing target W are determined as having made contact, the processing advances to Step S4.

Figure 4:
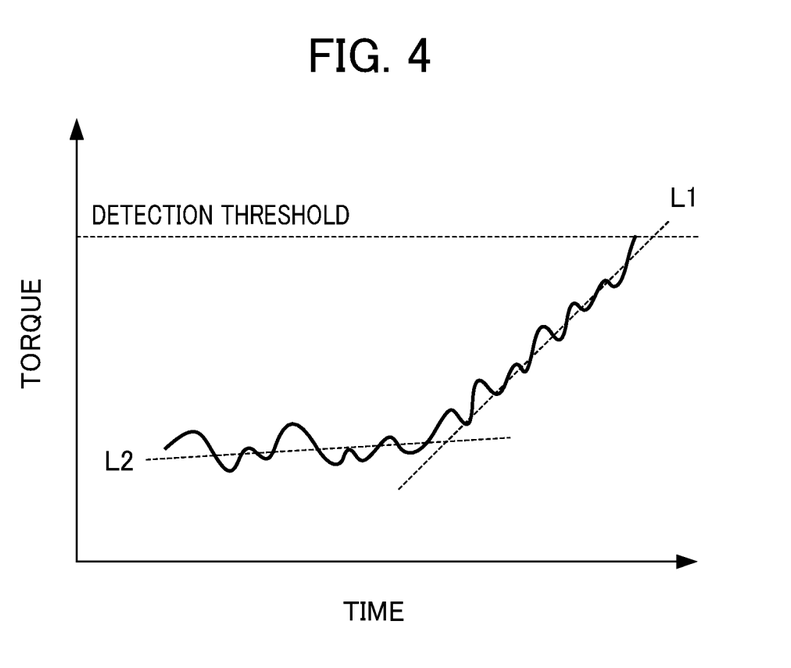
FIG. 4 is a graph illustrating a change in torque information of an internal drive axis motor.

It should be noted that, as shown in FIG. 4, the drive axes J1 to J6, K and L detected by the torque information detection unit 44 can include a certain fluctuation (variation), i.e. deviation relative to the theoretical output torque of the drive axes J1 to J6, K and L, according to influences such as the friction of the reduction device, characteristics of the servomotor, inertia of the robot 10 and processing head 20, etc. For this reason, the detection threshold is set to a value which can detect that torque of the control target axis has significantly risen, in consideration of the fluctuation in torque.

In addition, while the torque of the control target axis is rising at a fixed slope, it is considered that the processing tools 21, 22 or processing target W is elastically deforming. For this reason, by setting the detection threshold within a range in which the torque of the control target axis rises at a fixed slope, it as possible to detect contact between the processing tools 21, 22 and processing target W prior to the processing tools 21, 22 or processing target W breaking or plastically deforming.

(Contact Time Estimation Step)

In the contact time estimation step of Step S4, the contact position estimation unit 45 references the time series data of the torque information of the control target axis stored in the storage unit 42, and estimates the contact time based on change in the change trend of the torque information of the control target axis. As an example, the contact position estimation unit 45 obtains two approximation straight lines L1, L2 of different slopes in the time series data of the torque information, and estimates the time at which these two approximation straight lines L1, L2 intersect as the contact time. One of the approximation straight lines L1 is calculated by going back a time from the time at which the torque reached the detection threshold, and the other approximation straight line L2 is calculated in the time passage direction from a time sufficiently earlier than the time at which the torque reached the detection threshold. The contact position estimation unit 45 thereby estimates the time at which determined that the slope (change amount per unit time) of the torque information of the control target axis changed as the contact time.

It should be noted that, as shown in FIG. 4, the torques of the drive axes J1 to J6, K and L detected by the torque information detection unit 44 can include a certain fluctuation (variation) Ni (i defined as representing any of drive axes J1 to J6, K and L) i.e. deviation relative to theoretical output torque of the drive axes J1 to J6, K and L, according to influences such as the characteristics of the servomotor, inertia of the robot 10 and processing head 20, etc. Such fluctuation has a tendency of being smaller for the wrist axes J4 to J6 deciding the posture of the processing head 20 than the base axes J1 to J3 deciding the position of the processing head 20. For this reason, in order to reduce the influence of torque fluctuation, it is preferable to try to use the torque information in the contact information estimation unit 45 for wrist axes J4 to J6.

In addition, a plurality of drive axes may be established as control target axes. By using the torque information of a plurality of control target axes, it is possible to reduce the influence of noise included in the torque information of each control target axis, and the prevention of misdetection and a precision improvement in the estimation of contact time can be expected.

If explaining in detail the torque detection of the drive axes J1 to J6, K and L by the torque information detection unit 44, when an external force F acts on the leading ends of the processing tools 21, 22, the external force moment Mi acting on each drive axis, in the case of the external force (counterforce from processing target) F acting on the tool leading end, can be represented by $Mi=(Pi \times F) \cdot Ai$, when defining a position vector linking the working point of the external force F from any point on the drive axes J1 to J6, K and L as P, and defining the unit vector in the drive axis direction as A. At this time, the counterforce torque (difference from torque in the case of an external force F not acting) Si acting on the drive axes J1 to J6, K and L from the external force F can be represented by $Si=Mi/Gi$, when defining the gear ratio of each drive axis as Gi. The detection sensitivity of torque of each drive axis J1 to J6, K and L by the torque information detection unit 44 is proportional to this counterforce torque Si.

For this reason, among the drive axes J1 to J6, K and L, by selecting a control target axis from among those having an S/N ratio, which is a ratio of counterforce torque Si relative to fluctuation Ni, that is large, it is possible to relatively accurately detect the contact between the processing tool 21, 22 and processing target W.

(Contact Position Estimation Step)

In the contact position estimation step of Step S5, the contact position estimation unit 45 references the time series data of positions of the drive axes J1 to J6, K and L, or positions of the processing tools 21, 22 stored in the storage unit 42, and estimates the positions of the processing tools 21, 22 at the contact time estimated in the contact time estimation step as the contact position with the processing target W.

(Target Position Compensation Step)

In the target position compensation step of Step S6, the target position compensation unit 46 compensates the target position of the processing head 20 in the work program, based on the contact position estimated by the contact position estimation unit 45. In other words, by compensating the target position of the processing head 20 to the contact estimated position, it is configured so that the processing tools 21, 22 do not excessively press the processing target W.

Each step from the aforementioned Step S2 to Step S6 is repeatedly performed until the drive of the tool drive axis K ends, i.e. sandwiching the processing target W by the processing tools 21, 22 and spot welding becomes possible. In other words, in the case of the first processing tool 21 contacting the processing target W first, it is possible to make the second processing tool 22 contact the processing target W by compensating the target position of the processing head 20.

As explained above, according to the robot system 1 of the first embodiment including the control device 40, contact between the processing tools 21, 22 and the processing target W is detected by monitoring the torque of the internal drive axes J1 to J6, tool drive axis K and external drive axis L. For this reason, with the robot system 1 of the first embodiment including the control device 40, compared to a case of not applying the torque of the external drive axis L, as a monitoring target, it can be expected to detect the contact between the processing tools 21, 22 and the processing target W at more abundant postures.

In addition, according to the robot system 1 of the first embodiment including the control device 40, the contact position between the processing tool 21, 22 of the processing head 20 and the processing target W is estimated based on the change in the change rend of torque information of the internal drive axis motor, and the target position of the robot 10 is compensated based on the estimated contact position. For this reason, it is possible to accurately detect the position at which the processing tool 21, 22 or processing target W starts elastic deformation, i.e. position at which the processing tool 21, 22 and processing target N make contact at first. The robot system 1 can thereby prevent the processing tools 21, 22 or processing target W from being damaged.

Second Embodiment

Figure 5:
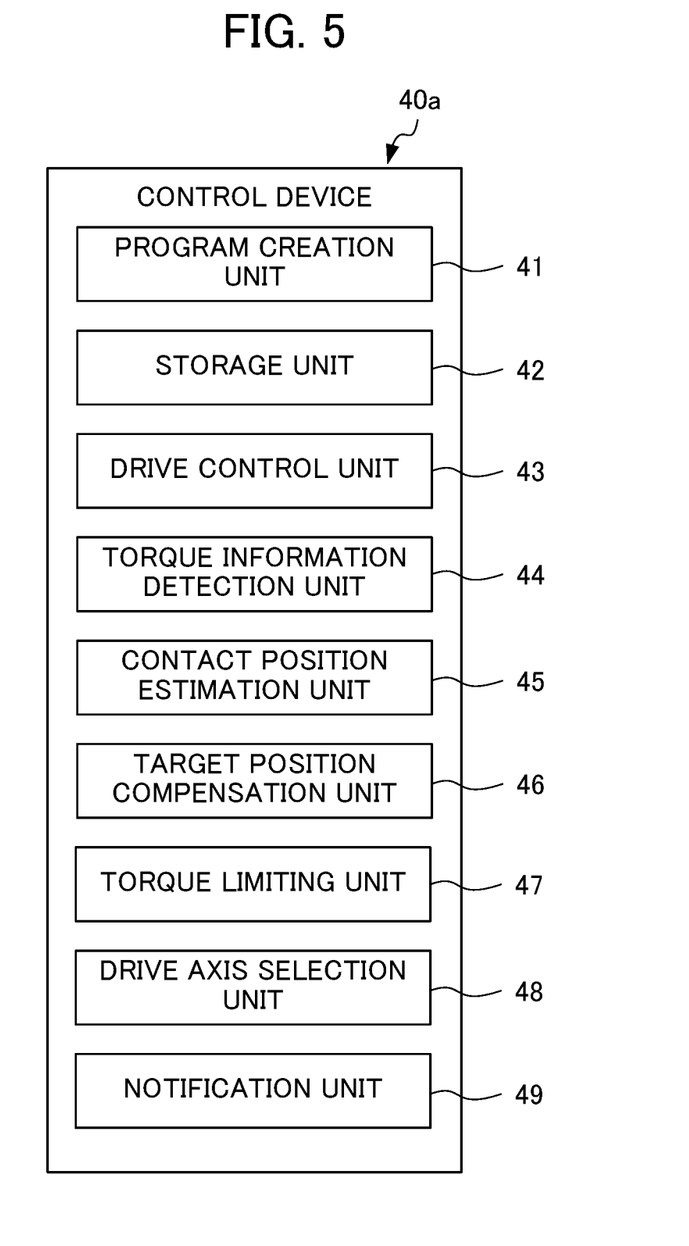
FIG. 5 is a block diagram showing the configuration of a control device for a robot system according to a second embodiment of the present disclosure.

Next, a robot system according to a second embodiment of the present disclosure will be explained. The robot system according to the second embodiment includes: the articulated robot 10, the processing head 20 which is retained to the leading end of the robot 10; an external driving mechanism 30 which causes the overall robot 10 to move relative to the processing target W and be positioned; and a control device (robot control device) 40a which controls operation of the robot 10, processing head 20 and external driving mechanism 30. In the robot system of the present embodiment, the robot 10, processing head 20 and external driving mechanism 30 are the same as the robot 10, processing head 20 and external driving mechanism 30 in the robot system 1 of the first embodiment. For this reason, in the following explanation, the same reference symbols are assigned to constituent elements which are the same as the constituent elements previously explained, and redundant explanations are omitted.

FIG. 5 is a block diagram showing the configuration of the control device 40a of the robot system according to the second embodiment. The control device 40a includes: the program creation unit 41; storage unit 42; drive control unit 43; torque information detection unit 44; contact position estimation unit 45; target position compensation unit 46; torque limit unit 47 which reduces the output torque of at least one torque limiting axis selected from among the drive axes J1 to J6, K and L; drive axis selection unit 48 which selects a control target axis or torque limiting axis from among the drive axes J1 to J6, K and L; and notification unit 49 which performs alarm notification.

The torque limiting unit 47 configures so that the output torque of the torque limiting axis does not become larger, by setting an upper limit value for the output torque of the torque limiting axis, or setting the gain of the drive speed of the torque limiting axis relative to the position deviation to be small. In the case of another drive axis being driven so as to cause the processing tools 21, 22 to further move to the side of the processing target W after the processing tools 21, 22 contact the processing target W, the torque limiting axis displaces so as to offset the movement of the processing tools 21, 22 by way of the other drive axis, by the torque acting on the torque limiting axis exceeding the output torque of the torque limiting axis by way of the counterforce of the processing target W. It is thereby possible for the force acting between the processing tool 21, 22 and processing target W to be prevented from excessively increasing, and thus prevent damage of the processing tools 21, 22 and breakage or deformation of the processing target W.

The drive axis selection unit 48 selects at least one control target axis from among the drive axes J1 to J6, K and L, or selects at least one torque limiting axis. In the case of the drive axis selection unit 48 selecting at least one control target axis, the torque limiting unit 47 is deactivated due to a torque limiting axis not existing. Conversely, in the case of the drive axis selection unit 48 selecting at least one control target axis, since a control target axis does not exist, the contact position estimation unit 45 and target position compensation unit 46 are deactivated. For this reason, the drive axis selection unit 48, by selecting the control target axis or torque limiting axis, switches between two control modes of a target position compensation mode which estimates the contact position between the processing target W and processing tools 21, 22 based on the change in the change trend of the torque information of the control target axis, and compensates the target positions of the processing tools 21, 22; and the torque limiting mode which limits the torque of the torque limiting axis.

The drive axis selection unit 48 selects the control target axis or the torque limiting axis based on the S/N ratio, which a ratio of the counterforce torque Si assumed by the control device as received by the internal drive axes J1 to J6, tool drive axis K and external drive axis L by counterforce during contact of the processing tools 21, 22 to the processing target W, relative to the deviation (fluctuation) between the theoretical output torque which can be produced when the processing tools 21, 22 are not contacting the processing target W and the torque indicated by the information detected by the torque information detection unit 44.

In the case of the S/N ratio of at least one of the drive axes J1 to J6, K and L being at least a predetermined first switching threshold, the drive axis selection unit 48 establishes at least one of the drive axes J1 to J6, K and L having S/N ratio of at least the first switching threshold as the control target axis. In addition, in the case of the S/N ratio of the drive axes J1 to J6, K and L being less than the first switching threshold, the drive axis selection unit 48 establishes at least one of the base axes J1 to J3 and external drive axis L as the torque limiting axis.

In addition, the drive axis selection unit 48, in the case of the S/N ratios of all of the drive axes J1 to j6, K and L being less than the first switching threshold, and the S/N ratios of the base axes J1 to J3 and external drive axis L being less than a predetermined second switching threshold, causes alarm notification to be performed in the notification unit 49.

The notification unit 49 controls the output devices such as a display performing visual display, and speakers which generate mechanical noise or speech, for example. In addition, the notification unit 49 is a notification interface, for example, and may perform alarm notification to an external teaching control panel.

Figure 6:
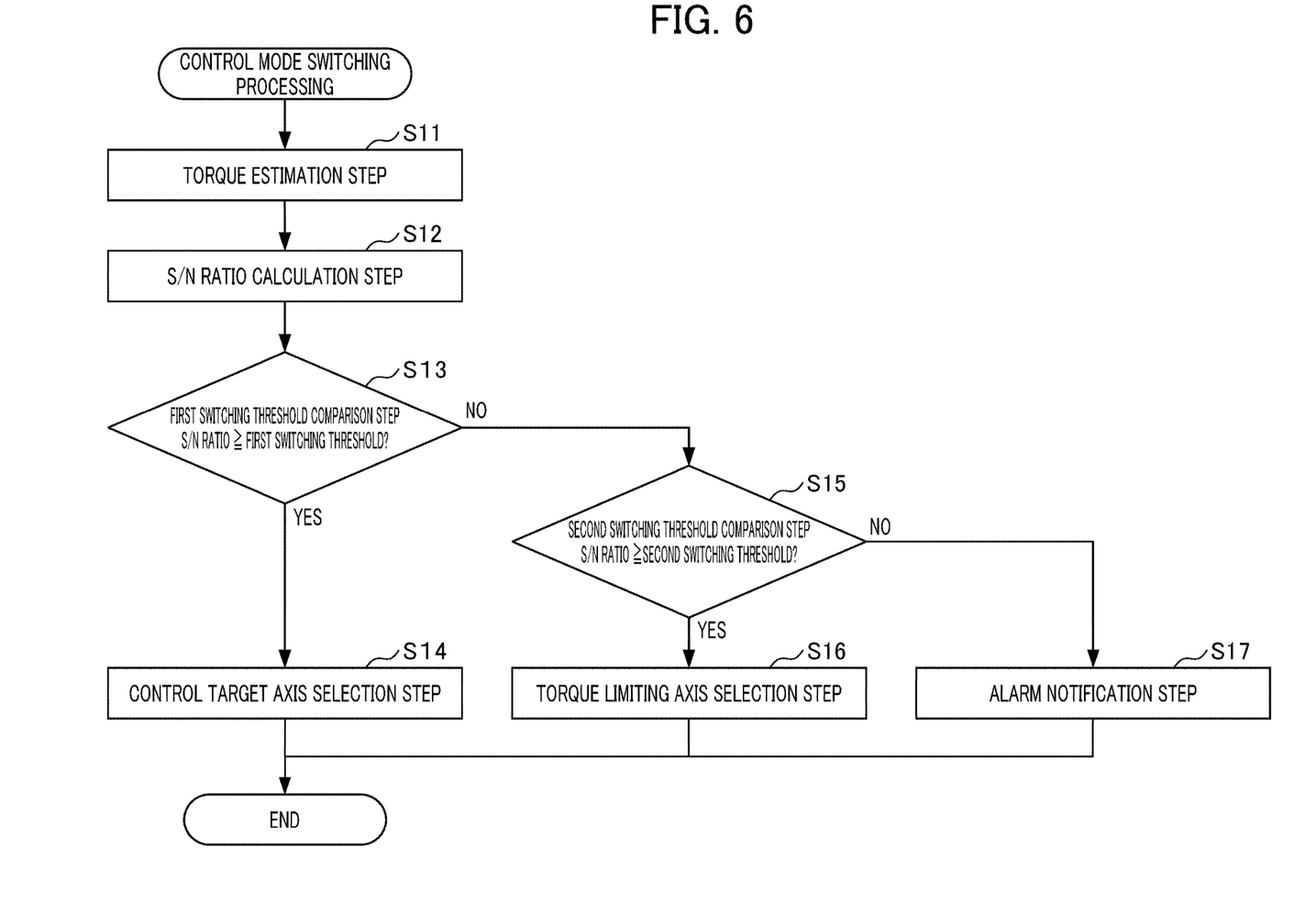
FIG. 6 a flowchart of control mode switching processing by the control device in FIG. 5.

Next, the switching processing of a control mode by the drive axis selection unit 48 of the control device 40*a* will be explained in detail. FIG. 6 shows a sequence of control mode switching processing by the control axis selection unit 48. This control mode switching processing is performed every time starting positioning of the processing head 20 to the target position corresponding to each welding point position.

The control mode switching processing includes: a step of estimating, in a posture change (position and speed of drive axes J1 to J6, K and L) of the robot 10 upon arranging the processing head 20 at the target position, the torque Si received by each drive axis J1 to J6, K and L in the case of the processing tools 21, 22 contacting the processing target W (Step S11: torque estimation step); step of calculating the ratio (S/N ratio) of the torque Si of each drive axis J1 to J6, K and L estimated in the torque estimation step relative to the fluctuation Ni assumed in each drive axis J1 to J6, K and L (Step S12: S/N ratio calculation step); step of comparing the S/N ratio calculated in the S/N ratio calculation step with the pre-set first switching threshold (Step S13: first switching threshold comparison step); step of selecting a control target axis from among the drive axes J1 to J6, K and L (Step S14: control target axis selection step); step of comparing the S/N ratio calculated in the S/N ratio calculation step with a pre-set second switching threshold (Step S15: second switching threshold comparison step); step of selecting a torque limiting axis from among the drive axes J1 to J6, K and L (Step S16: torque limiting axis selection step); and a step of causing alarm notification to be performed in the notification unit 49 (Step S17: alarm notification step).

(Torque Estimation Step)

In the torque estimation step of Step S11, in the case of an external force F of fixed magnitude acting on the leading end of the processing tools 21, 22 due to a posture change of the respective drive axes J1 to J6, K and L upon arranging the processing head 20 at the target position according to the work program, the counterforce torque Si=Mi/Gi acting on the drive axes J1 to J6, K and L is calculated.

(S/N Ratio Calculation Step)

In the S/N ratio calculation step of Step S12, the ratio (S/N ratio) between the torque Si received by each drive axis J1 to J6, K and L calculated in the torque estimation step, and the fluctuation Ni of torque of each drive axis J1 to J6, K and L set in advance are respectively calculated. The fluctuation Ni of torque of each drive axis J1 to J6, K and L can be estimated from the structure of the robot 10, processing head 20 and external driving mechanism 30. In addition, the fluctuation Ni of torque of each drive axis J1 to J6, K and L may use a value calculated from the deviation of the torque at each time in the time series data of the torque information detected by the torque information detection unit 44 during past running relative to the approximation straight lines L1, L2.

(First Switching Threshold Comparison Step)

In the first switching threshold comparison step of Step S13, it is confirmed whether the S/N ratio of each drive axis J1 to J6, K and L calculated in the S/N ratio calculation step is at least the first switching threshold. In the case of the S/N ratio of at least one drive axis among the drive axes J1 to J6, K and L being at least the first switching threshold in this first switching threshold comparison step, the processing advances to the control target axis selection step of Step S14. On the other hand, in the case of the S/N ratios of all of the drive axes J1 to J6, K and L being less than the first switching threshold, the processing advances to the second switching threshold comparison step of Step S15.

(Control Target Axis Selection Step)

In the control target axis selection step of Step S14, at least one of the drive axes having an S/N ratio of at least the first switching threshold among the drive axes J1 to J6, K and L is established as the control target axis. As an example, the drive axis selection unit 48 can establish a drive axis having the largest S/N ratio as the control target axis, and may establish a plurality of drive axes having large S/N ratios as control target axes.

(Second Switching Threshold Comparison Step)

In the second switching threshold comparison step of Step S15, it is confirmed whether the S/N ratios of the base axes J1 to J3 and external drive axis L are at least the second switching threshold which is smaller than the first switching threshold. In the case of the S/N ratio of at least one drive axis among the base axes J1 to J3 and external drive axis L is at least the second switching threshold in this second switching threshold comparison step, the processing advances to the torque limiting axis selection step of Step S16. On the other hand, in the case of the S/N ratios of all of the base axes J1 to J3 and external drive axis L being less than the second switching threshold, the processing advances to the alarm notification step of Step S17.

(Torque Limiting Axis Selection Step)

In the torque limiting axis selection step of Step S16, at least one drive axis among the base axes J1 to J3 and external drive axis L is established as the torque limiting axis. As an example, it is possible to establish the drive axis having the largest S/N ratio as the limiting target, and a plurality of drive axes having large S/N ratio may be established as torque limiting axes.

(Alarm Notification Step)

In the alarm notification step of Step S17, alarm notification is made to be performed in the notification unit. In other words, the drive axis selection unit, in the case of the S/N ratios of all of the drive axes J1 to J6, K and L being less than the first switching threshold, and the S/N ratios of all of the base axes J1 to J3 and external drive axis L, being less than a predetermined second switching threshold, produces warning to the operator, since it is determined that there is concern over not being able to prevent damage of the processing tools 21, 22 or processing target W with either of the target position compensation mode or torque limiting mode. The operator can allow spot welding to be performed safely with the robot system, by compensating the teaching data or work program so as to change the posture positioning to the welding spot position.

The robot system of the present embodiment can reliably prevent damage of the processing tools 21, 22 and processing target W in more postures of the robot 10, by properly using the target position compensation mode and torque limiting mode depending on the posture of the robot 10 in this way.

Third Embodiment

Figure 7:
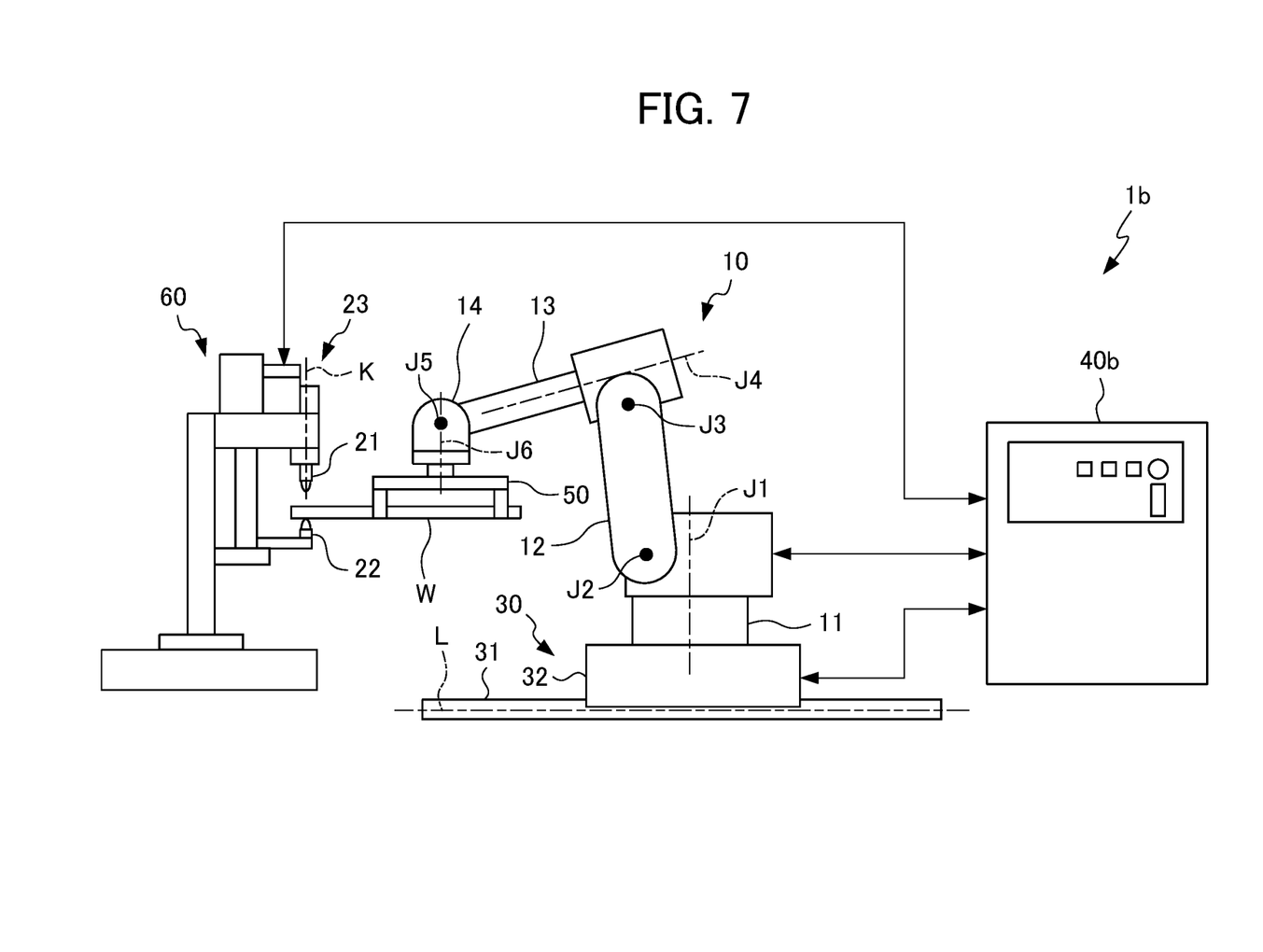
FIG. 7 is a schematic diagram showing the configuration of a robot system according to the first embodiment of the present disclosure.

Next, a robot system according to a third embodiment of the present disclosure will be explained. FIG. 7 is a view showing the configuration of a robot system 1b according to the third embodiment of the present disclosure. The robot system according to the third embodiment includes: the articulated robot 10; a hand 50 which is provided to the leading end of the robot 10 and retains the processing target W; the external driving mechanism 30 which causes the overall robot 10 to move for positioning; a processing device 60 which is arranged independently from the robot 10; and a control device (robot control device) 40b which controls operation of the robot 10, external driving mechanism 30 and processing device 60.

The hand 50 fixes the processing target W to the leading end of the robot 10, and does not have an axis which is driven during operation.

The processing device 60 has the first processing tool 21 and second processing tool 22 which are provided facing each other; and a clamp mechanism 23 having a tool drive axis K that causes the first processing tool 21 to move towards the second processing tool 22. The processing device 60 in the robot system 1b of the third embodiment can be considered as a device made by arranging the processing head 20 in the robot system 1 of the first embodiment to be separated from the robot 10.

The control device 40b in the robot system 1 of the third embodiment can be established as device which performs similar control as the control device 40 in the robot system of the first embodiment, or the control device 40a in the robot system of the second embodiment, except for the point of the set point differing due to the difference between the mechanical configurations of the aforementioned robot 10, processing device 60 and external driving mechanism 30, and the mechanical configuration of the robot system of the first embodiment.

The robot system 1b of the present embodiment can also prevent damage of the processing tools 21, 22 and processing target W.

Although embodiments of a robot system according to the present disclosure have been explained above, the robot system according to the present disclosure is not limited to the aforementioned embodiments. In addition, the effects described in the present embodiments are merely listing the most preferred effects produced from the present disclosure, and the effects from the robot system according to the present disclosure are not limited to those disclosed in the present embodiment.

As an example, in the aforementioned embodiments, the processing head 20 and processing device 60 are a so-called C-type spot welding gun; however, the processing head or processing device of the robot system according to the present disclosure may be a so-called X-type spot welding gun or the like.

In addition, the aforementioned embodiments exemplify a spot welding system; however, the robot system according to the present disclosure is not limited to a spot welding system. The robot system according to the present disclosure is applicable to various robot systems which cause a processing tool to make contact with a processing target such as stud welding, riveting, and stacking of processing targets, and conducts predetermined processing on the processing target.

EXPLANATION OF REFERENCE NUMERALS 1 robot system
10 robot
11 stand
12 lower arm
13 upper arm
20 processing head
21 first processing tool
22 second processing tool
30 external driving mechanism
40, 40a, 40b control device (robot control device)
41 program creation unit
42 storage unit 43 drive control unit
44 torque information detection unit
45 contact position estimation unit
46 target position compensation unit
47 torque limiting unit
48 drive axis selection unit
49 notification unit
50 hand
60 processing device
C1 first axis (internal drive axis, base axis)
J2 second axis (internal drive axis, base axis)
J3 third axis (internal drive axis, base axis)
J4 fourth axis (internal drive axis, wrist axis)
J5 fifth axis (internal drive axis, wrist axis)
J6 sixth axis (internal drive axis, wrist axis)
K tool drive axis
L external drive axis
W processing target (processing target)

What is claimed is:

1. A robot control device for a robot system, the robot system including:
   an articulated robot having a plurality of internal drive axes;
   a processing head which is retained to a leading end of the robot, and has a processing tool and a tool drive axis that causes the processing tool to move; and
   an external driving mechanism which has one or more external drive axes and positions the robot,
   wherein the robot system causes the processing tool to make contact with a processing target, and conducts predetermined processing on the processing target,
   wherein a control device controls the plurality of internal drive axes and the one or more external drive axes so as to position the processing head at a target position which is set as a position of processing the processing target, and controls the tool drive axis so as to make the processing tool make contact with the processing target, and
   wherein the robot control device detects contact between the processing tool and the processing target by monitoring torques of the plurality of internal drive axes, the tool drive axis and the one or more external drive axes, and performs position compensation of the robot.

2. The robot control device according to claim 1, comprising a processor, the processor being configured to:
   detect torque information of the plurality of internal drive axes, the tool drive axis and the one or more external drive axes;
   estimate a contact position at which the processing tool and the processing target make contact, based on a change in change trend of the detected torque information of at least one control target axis among the plurality of internal drive axes, the tool drive axis and the one or more external drive axes; and
   compensate a target position of the processing head, based on the estimated contact position.

3. The robot control device according to claim 2, wherein the processor selects the control target axis, based on an S/N ratio, which is a ratio of torque estimated as received by the plurality of internal drive axes, the tool drive axis and the one or more external drive axes by counterforce during contact of the processing tool to the processing target, relative to deviation between theoretical output torque which can be produced when the processing tool is not contacting the processing target, and the detected torque.

4. The robot control device according to claim 3, wherein the processor reduces output torque of at least one torque limiting axis among the plurality of internal drive axes, the tool drive axis and the one or more external drive axes,
   wherein the plurality of internal drive axes includes a plurality of base axes which mainly decide a position of the processing head, and at least one wrist axis which mainly decides orientation of the processing head, and
   wherein the processor, in a case of the S/N ratios of all of the plurality of internal drive axes, the tool drive axis and the one or more external drive axes being less than a predetermined first switching threshold, establishes at least one of the base axis and the one or more external drive axes as the torque limiting axis.

5. The robot control device according to claim 4, wherein at least one of the base axis and the one or more external drive axes having the S/N ratio of at least a predetermined second switching threshold is set as the torque limiting axis, in a case of the S/N ratios of all of the plurality of internal drive axes, the tool drive axis and the one or more external drive axes being less than the first switching threshold.

6. The robot control device according to claim 5, wherein the processor performs an alarm notification,
   wherein the processor causes alarm notification to be performed, in a case of the S/N ratios of all of the plurality of internal drive axes, the tool drive axis and the one or more external drive axes being less than the first switching threshold, and the S/N ratios of all of the base axes and the one or more external drive axes being less than a predetermined second switching threshold.

7. The robot control device according to claim 2, wherein a change in change trend of the torque information is a change in a change amount per unit time of the torque information.

8. The robot control device according to claim 1, comprising a processor, the processor being configured to:
   detect torque information of the plurality of internal drive axes, the tool drive axis and the one or more external drive axes;
   estimate a contact position at which the processing tool and the processing target make contact, based on a change in a change trend of the detected torque information of at least one control target axis among the plurality of internal drive axes, the tool drive axis and the one or more external drive axes; and
   compensate a target position of the processing target, based on the estimated contact position.

9. A robot system comprising:
   the robot control device according to claim 1;
   an articulated robot which has a plurality of internal drive axes controlled by the robot control device;
   a processing head which is retained to a leading end of the robot, and has a processing tool controlled by the robot control device, and a tool drive axis that causes the processing tool to move; and
   an external driving mechanism which has one or a plurality of external drive axes controlled by the robot control device, and positions the robot.

10. The robot system according to claim 9, wherein the processing tool is a welding electrode.

11. A robot control device for a robot system, the robot system including:
   an articulated robot having a plurality of internal drive axes;
   a processing head which is retained to a leading end of the robot, and has a processing tool and a tool drive axis that causes the processing tool to move; and
   an external driving mechanism which has one or more external drive axes and positions the robot, wherein the robot system causes the processing tool to make contact with a processing target, and conducts predetermined processing on the processing target, wherein a control device controls the plurality of internal drive axes and the one or more external drive axes so as to position the processing head at a target position which is set as a position of processing the processing target, and controls the tool drive axis so as to make the processing tool make contact with the processing target, and wherein the robot control device comprises a processor that reduces output torque of at least one torque limiting axis among the plurality of internal drive axes and the one or more external drive axes.

* * * * *